United States Patent
Tran et al.

(10) Patent No.: US 11,195,402 B2
(45) Date of Patent: Dec. 7, 2021

(54) PREDICTIVE WARNING SYSTEM

(71) Applicant: INTERNATIONAL BUSINESS MACHINES CORPORATION, Armonk, NY (US)

(72) Inventors: Khoi-Nguyen Dao Tran, Southbank (AU); Jorge Andres Moros Ortiz, Melbourne (AU); Timothy M. Lynar, Dickson (AU); John Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/521,614

(22) Filed: Jul. 25, 2019

(65) Prior Publication Data

US 2021/0027598 A1   Jan. 28, 2021

(51) Int. Cl.
*G08B 21/02* (2006.01)
*G06N 5/04* (2006.01)

(52) U.S. Cl.
CPC ............. *G08B 21/02* (2013.01); *G06N 5/048* (2013.01)

(58) Field of Classification Search
CPC ........ G08B 21/02; G08B 21/18; G06N 5/048; G08G 1/16; G08G 1/166; B60Q 9/008; B60Q 1/525; B60Q 1/2673; G06Q 50/08
See application file for complete search history.

(56) References Cited

U.S. PATENT DOCUMENTS

| 6,208,260 B1* | 3/2001 | West | B66C 15/06 340/5.1 |
| 6,341,237 B1* | 1/2002 | Hurtado | A61N 1/36014 607/148 |
| 6,876,883 B2* | 4/2005 | Hurtado | A61N 1/321 482/1 |
| 6,894,621 B2 | 5/2005 | Shaw | |
| 7,212,120 B2* | 5/2007 | Gudat | B66C 15/045 340/572.1 |

(Continued)

FOREIGN PATENT DOCUMENTS

| CN | 102542361 A | 7/2012 |
| JP | 05229784 A | 9/1993 |
| WO | 2016029238 A1 | 3/2016 |

OTHER PUBLICATIONS https://gwulo.com/atom/27974, "Gwulo" Old Hong Kong, HSBSC headquarters-construction cranes with wind sailes-1983, printed May 20, 2019, pp. 1-5.

(Continued)

*Primary Examiner* — Adnan Aziz
(74) *Attorney, Agent, or Firm* — John Noh

(57) ABSTRACT

A method, a computer program product, and a computer system warn workers of a hazardous condition on a worksite. The method includes determining at least one outcome involving a worker and at least one worksite object based on conditions of the worksite. The method includes predicting whether a select one of the at least one outcome presents a hazardous condition to the worker. As a result of predicting that the select outcome presents the hazardous condition, the method includes transmitting a signal to a device associated with the worker. The signal triggers a warning to be received by the worker where the device is in a proximity of the worker.

18 Claims, 5 Drawing Sheets

(56) References Cited

U.S. PATENT DOCUMENTS

| | | | | |
|---|---|---|---|---|
| 8,082,762 | B2* | 12/2011 | Burr | D04B 1/246 66/175 |
| 8,285,381 | B2* | 10/2012 | Fahey | A61N 1/36003 607/48 |
| 8,362,883 | B2* | 1/2013 | Hale | G09B 21/003 340/407.1 |
| 8,648,709 | B2* | 2/2014 | Gauger | F16P 3/14 340/539.1 |
| 8,680,991 | B2* | 3/2014 | Tran | A61B 5/389 340/540 |
| 9,302,890 | B1 | 4/2016 | Vogt | |
| 9,672,713 | B2* | 6/2017 | Beggs | B60Q 1/525 |
| 9,914,624 | B2* | 3/2018 | Fulton | B66C 17/04 |
| 2007/0027732 | A1* | 2/2007 | Hudgens | G06Q 10/06312 705/7.15 |
| 2009/0312817 | A1* | 12/2009 | Hogle | A61N 1/0548 607/54 |
| 2012/0098653 | A1* | 4/2012 | Slack | B60Q 9/008 340/435 |
| 2012/0217091 | A1* | 8/2012 | Baillargeon | B66F 11/04 182/18 |
| 2012/0317058 | A1* | 12/2012 | Abhulimen | G06N 20/00 706/2 |
| 2013/0187785 | A1 | 7/2013 | McIntosh | |
| 2013/0207791 | A1* | 8/2013 | Olsson | G01V 3/081 340/407.1 |
| 2013/0218456 | A1* | 8/2013 | Zelek | G01C 21/20 701/412 |
| 2013/0335221 | A1* | 12/2013 | Prieto | G06Q 10/10 340/540 |
| 2015/0145700 | A1* | 5/2015 | Beggs | G08G 1/005 340/944 |
| 2016/0304326 | A1 | 10/2016 | Shubel | |
| 2016/0325675 | A1* | 11/2016 | Bharwani | G08G 1/166 |
| 2017/0061337 | A1 | 3/2017 | Kezeu | |
| 2018/0005503 | A1* | 1/2018 | Kaindl | G08G 1/005 |
| 2018/0286232 | A1* | 10/2018 | Shau | G08G 1/09623 |
| 2019/0001885 | A1 | 1/2019 | Hathaway | |
| 2019/0094834 | A1* | 3/2019 | Bramberger | G06Q 10/06315 |
| 2020/0043368 | A1* | 2/2020 | Brathwaite | H04W 4/20 |
| 2020/0071912 | A1* | 3/2020 | Kennedy | E02F 9/261 |
| 2020/0074383 | A1* | 3/2020 | Smith | F16P 3/14 |
| 2020/0189507 | A1* | 6/2020 | Green | B60Q 5/005 |
| 2020/0255267 | A1* | 8/2020 | Wong | B66C 15/00 |
| 2021/0007874 | A1* | 1/2021 | Galiana Bujanda | B25J 9/0006 |

OTHER PUBLICATIONS

Mell et al., "The NIST Definition of Cloud Computing", National Institute of Standards and Technology, Special Publication 800-145, Sep. 2011, pp. 1-7.

VERTIKAL.net "Retractable Windsail for Tower Cranes", Jul. 10, 2016, https://www.vertikal.net/en/news/story/26580/retractable-windsail-for-to. . . , pp. 1-4.

* cited by examiner

PREDICTIVE WARNING SYSTEM

BACKGROUND

The exemplary embodiments relate generally to work environments, and more particularly to warning workers on a worksite of hazardous conditions.

Workers on a worksite may interact with various objects and other workers. At any given moment, a worker may encounter a hazardous condition. For example, a construction worksite may present a dangerous work environment, particularly from worksite objects including construction machinery that may be operating. When a crane moves heavy materials around the construction site, a worker may be located on or near a path that the construction machinery and/or the heavy material is being moved (e.g., overhead), creating a severe safety hazard. If the materials were to inadvertently fall or if the construction machinery were to move on a path without consideration of the workers in the path, the workers at the construction worksite may be injured or worse.

SUMMARY

The exemplary embodiments disclose a method, a computer program product, and a computer system for warning workers of a hazardous condition on a worksite. The method comprises determining at least one outcome involving a worker and at least one worksite object based on conditions of the worksite. The method comprises predicting whether a select one of the at least one outcome presents a hazardous condition to the worker. As a result of predicting that the select outcome presents the hazardous condition, the method comprises transmitting a signal to a device associated with the worker. The signal triggers a warning to be received by the worker where the device is in a proximity of the worker.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
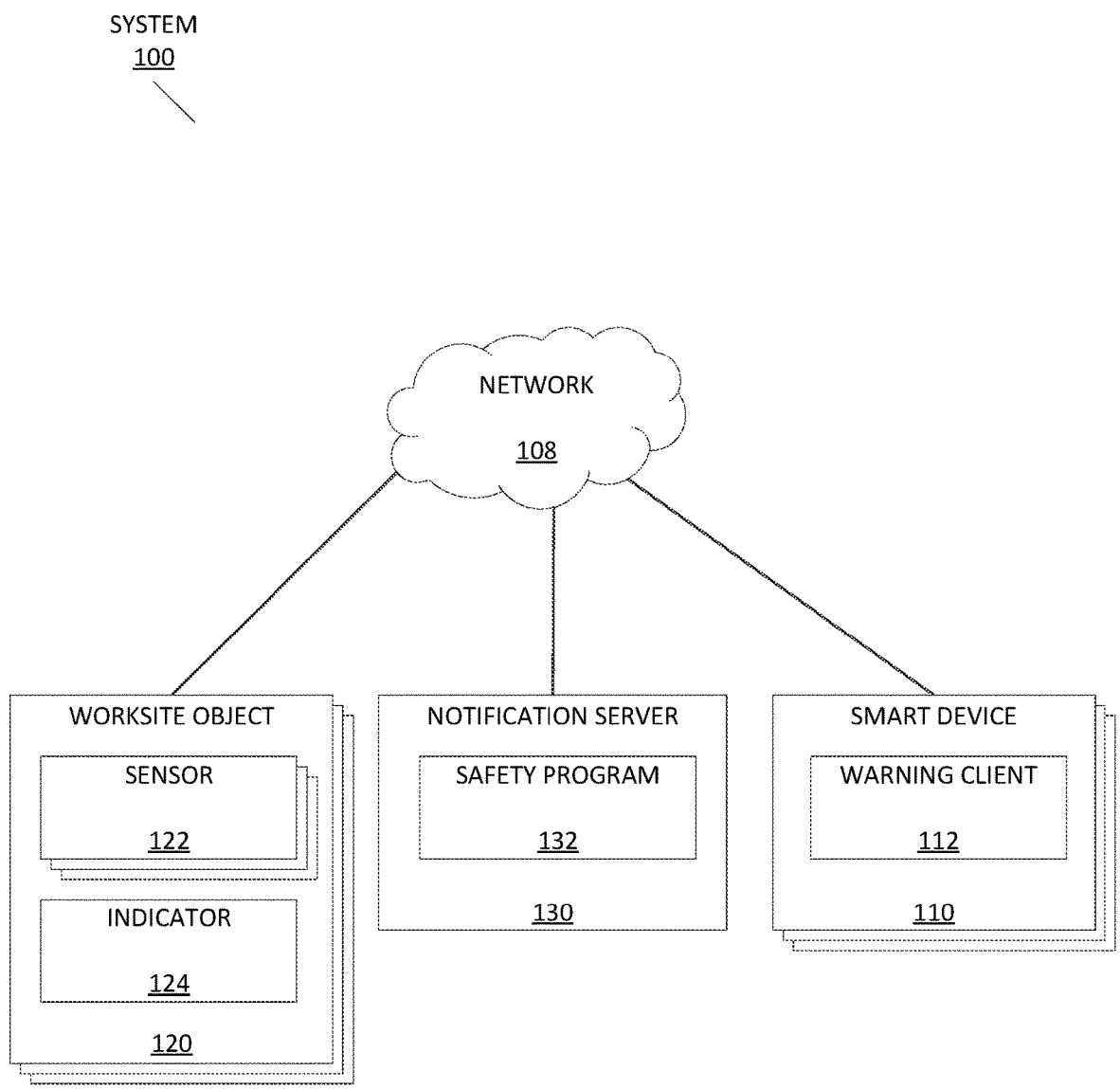
FIG. 1 depicts an exemplary schematic diagram of a warning system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for warning workers on a worksite of a hazardous condition that may be present. As will be described in greater detail below, the exemplary embodiments are configured to monitor the worksite and the dynamic conditions that may be present. Based on the conditions, the exemplary embodiments may predict when a hazardous condition will exist for each of the workers on the worksite. As a result of the hazardous condition being predicted for a selected worker, the exemplary embodiments may generate a signal that is transmitted to a device associated with the selected worker that instructs the device to generate a warning so that the worker may avoid the hazardous condition. Key benefits of the exemplary embodiments may include warning the workers on a worksite of a hazardous condition that allows the workers to take preventative measures and avoid risks as well as being at risk. Detailed implementation of the exemplary embodiments follows.

Conventional approaches to addressing hazardous conditions on a construction worksite utilize static warning systems that only consider the current situation of the worker or the worksite object (e.g., construction machinery). In a first conventional approach, a basic warning system may entail a rudimentary audible warning when any activity related to operation of select construction machinery (e.g., cranes) is performed. However, such warning systems may become disruptive, particularly on busy worksites. A worker may also start to pay less attention when the warning is ongoing or frequent warnings are broadcast, particularly when the warning is not directed toward the worker. These systems may utilize lights, lasers, or audio output components that broadcast warnings without consideration of the situational context of the worksite or to each worker on the worksite. For example, the lights or lasers may be fixed warning lights for overheard cranes and platforms, static safety zone lights that move with the crane, warning announcements broadcast throughout the facility, generic alerts for the workers, etc. When the approach utilizes lights or lasers, the system may require that workers wear protective eyewear while on the worksite when the protective eyewear may not have been necessary. Use of the protective eyewear when not required but for the lights or lasers may potentially diminish a field of view of the workers.

Other conventional approaches to address hazardous conditions may rely on workers in the worksite actively paying attention for any warning without directly warning the workers. In a second conventional approach, a system may plan a path to lift an object by a crane. Although the system may determine a path that avoids hazardous conditions, there is no warning provided to workers, particularly after the path has been planned. In a third conventional approach, a system may equip a crane with a warning system that uses information gathered by acceleration sensors, motion sensors, hydraulic sensors, remote communications, and/or a camera. The system is designed to warn the crane operator about movements of the crane. Thus, the crane operator is entirely responsible for preventing hazardous conditions with no warning being provided to workers. In a fourth conventional approach, a system may equip a crane with a lighting system that generates a laser signal projected onto a surface corresponding to the position of the crane or crane components. However, the system is designed to ensure that the crane or crane components do not enter designated safety zones. In a fifth conventional approach, a system may equip construction machinery with a laser scan device or light generator that forms a conical colored laser beam film or light pattern, respectively, that indicates a dangerous zone corresponding to operation of the construction machinery. However, the system only provides a visual warning that the workers are required to remain cognizant. The use of the laser beam film also forces the workers to use protective eyewear while in the worksite.

The exemplary embodiments are configured to warn a worker on a worksite of a hazardous condition that the worker is predicted to face so that the worker may avoid the hazardous condition. With particular regard to construction worksites, the exemplary embodiments may address severe hazardous conditions involving overhead cranes, construction vehicles, construction machinery, construction materials, etc. to which the worker may be predicted to be exposed while on the worksite. The exemplary embodiments may monitor and dynamically determine a state of the worksite to determine whether a hazardous condition is predicted for a selected one of the workers on the worksite. As a result of determining the hazardous condition relative to the selected worker, the exemplary embodiments may be configured to generate an alert or warning using a sensory feedback output so that the selected worker may take appropriate action in avoiding the hazardous condition.

The exemplary embodiments are described with regard to a construction worksite and determining hazardous conditions that may occur on the construction worksite. Due to the nature of construction worksites, the state of the worksite may result in fatalities or in workers being grievously injured. Accordingly, the exemplary embodiments may be directed toward the construction worksite to minimize or eliminate such instances. However, the exemplary embodiments being directed to the construction worksite and hazardous conditions associated with the construction worksite is only illustrative. The exemplary embodiments may be utilized in any scenario including different worksites and predict a condition that may result in injury. For example, the exemplary embodiments may be used in an office workspace to prevent instances where office workers are physically harmed (e.g., warning a worker turning a corner and preventing the worker from running into another worker, warning a worker of office equipment precariously positioned that may fall, etc.). In another example, the exemplary embodiments may be used in a home setting to prevent instances where residents are injured (e.g., warning a resident to evacuate when a gas leak is detected, warning a resident when a bathroom has wet conditions that may result in a slip and fall, etc.). In a further example, the exemplary embodiments may be used in a kitchen or restaurant to prevent instances where cooks or restaurant workers are injured (e.g., warning a person in a kitchen to avoid wet conditions that may result in a slip and fall, warning a person in a kitchen to avoid steam vents or other heated conditions that may result in burns, warning a waiter to avoid a spill of a liquid or broken glass in a dining area, etc.).

FIG. 1 depicts a warning system 100, in accordance with the exemplary embodiments. The warning system 100 may be used on a construction worksite to warn workers of predicted hazardous conditions. According to the exemplary embodiments, the warning system 100 may include one or more smart devices 110, one or more worksite objects 120, and a notification server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the warning system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the warning system 100 that do not utilize the network 108. In a particular embodiment, the network 108 may be a LAN having an operating area covering the construction worksite.

In the exemplary embodiments, the smart device 110 may include a warning client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. The smart device 110 may be associated with a respective worker who is on the construction worksite. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3, as part of a cloud implementation with reference to FIG. 4, and/or as utilizing functional abstraction layers for processing with reference to FIG. 5.

In an exemplary embodiment, the smart device 110 may be incorporated in an article of clothing worn by a worker. For example, while on the construction worksite, the worker may wear a safety vest. The smart device 110 may be incorporated in the safety vest such that a sensory feedback generated by the smart device 110 may be perceived by the worker. The smart device 110 may be passively used by the worker. For example, the smart device 110 may perform automated operations without any user intervention. As will be described in detail below, information from the smart device 110 may be used as part of a basis in determining when a warning is to be generated while the worker is not actively utilizing the smart device 110 for purposes of predicting hazardous conditions. The smart device 110 being embodied through incorporation in an article of clothing is only illustrative and other embodiments may be utilized for the exemplary embodiments. In other exemplary embodiments, the smart device 110 may be a worker's personal mobile device, a work device, etc. that is within a proximity of the worker.

In the exemplary embodiments, the warning client 112 may act as a client in a client-server relationship and may be a software, hardware, and/or firmware based application capable of generating a warning through an input received via the network 108. In the exemplary embodiments, the warning client 112 may passively operate with one or more components of the warning system 100 to generate the warning, and utilize various wired and/or wireless connection protocols for data transmission and exchange associated with generating a warning for a passenger, including Bluetooth, 2.4 gHz and 5 gHz Internet, near-field communication, Z-Wave, Zigbee, etc.

The warning client 112 may be configured to instruct the smart device 110 to generate a sensory feedback output to the worker indicating that the worker may face a hazardous condition on the construction worksite. As will be described in further detail below, the warning client 112 may receive an input from the notification server 130 that has predicted a hazardous condition for the worker associated with the smart device 110. In a further exemplary embodiment, the warning client 112 may receive an input from the worksite objects 120. As a result of receiving this input, the warning client 112 may transmit the instruction to a component of the smart device 110 that generates the sensory feedback output. The smart device 110 may include a sensory component that transforms the sensory feedback output into a corresponding warning to the passenger. For example, the smart device 110 may include an auditory sensory component such as an audio output device that outputs an auditory feedback that indicates the hazardous condition. In another example, the smart device 110 may include a visual sensory component such as a lighting device or a screen that outputs a visual feedback that indicates the hazardous condition. In a further example, the smart device 110 may include a haptic sensory component such as a vibration device that outputs a haptic feedback that indicates the hazardous condition. Based on the input from the notification server 130, the warning client 112 may also generate the warning to indicate a direction that the hazardous condition is predicted to occur or indicate a direction that the worker is to move to avoid the hazardous condition. For example, the sensory feedback output may generate a directional visual output (e.g., an arrow), a plurality of different auditory outputs that uniquely indicates a direction (e.g., an instruction speaking the direction), a plurality of different haptic outputs that uniquely indicates a direction (e.g., based on a location of the vibration device strategically positioned on the safety vest), etc.

In the exemplary embodiments, the worksite object 120 may represent any object that may be in a construction worksite. The worksite object 120 may be stationary objects that are fixed in position, semi-stationary objects having restricted mobility, mobile objects having unrestricted mobility, moveable objects that may be moved by another worksite object 120, etc. For example, the worksite object 120 may be construction machinery (e.g., a crane, a weld, a furnace, etc.) or construction vehicles (e.g., a bulldozer, a dump truck, a backhoe, etc.). In another example, the worksite object 120 may be construction materials (e.g., metal beams, metal plates, bricks, cement, palettes, etc.).

The worksite object 120 may be equipped with one or more sensors 122. The sensors 122 may generate sensor data indicative of parameters including movement, orientation, location, direction, speed, etc. of the worksite object 120. For example, the sensors 122 may include imagers and/or ultrasound sensors (e.g., transmitters and receivers). The imagers may generate image data of a surrounding around the worksite object 120. The ultrasound sensors may generate ultrasound data to detect distances to objects around the worksite object 120. The image data and/or the ultrasound data may also be used to detect the above noted parameters and/or changes thereto over time of the worksite object 120 to which the sensor 122 is associated, other worksite objects 120, the workers on the construction worksite, etc. (e.g., based on changes from first data at a first time to second data at a second, subsequent time). In another example, the sensors 122 may include an accelerometer, a force based sensor, a gyroscope, etc. that generates position and orientation data of the worksite object 120 to which the sensor 122 is associated. In a further example, the sensors 122 may include environmental sensors (e.g., a thermometer, a barometer, a precipitation gauge, etc.) that generate environmental data regarding the construction worksite that may impact the above noted parameters or conditions being experienced at the construction worksite. The sensors 122 may be configured to exchange the respective data being generated with the notification server 130 via the network 108.

The exemplary embodiments may also utilize information measured by devices of the smart devices 110. Accordingly, the sensors 122 may represent any source from which information of the worksite objects 120 and the workers may be ascertained. For example, the smart devices 110 may include substantially similar sensors 122 described above with regard to the worksite objects 120. In another example, the smart devices 110 may include positioning sensors or positioning applications (e.g., GPS, triangulation, network signal positioning, etc.) that indicate a location of the smart devices 110, particularly within the construction worksite.

The worksite object 120 may further be equipped with an indicator 124. The indicator 124 may broadcast a signal or generate a lighted point or area that indicates a path that a worksite object 120 is occupying or will occupy. For example, the worksite object 120 may be a crane. The indicator 124 may be a downward facing spotlight at a tip of an operating arm of the crane that signals overhead dangers. The indicator 124 may also include a wireless signal that may be utilized in generating the warning for the workers. For example, the wireless signal may be infrared based, Bluetooth based, etc. The wireless signal may correspond to the information of the signal indicating the path or position of the worksite objects 120. For example, a worker may be predicted to be in a position in a hazardous area that the worksite object 120 occupies based on the wireless signal. The hazardous area may include a current position of the worksite object 120 as well as a predicted and possible zone that the worksite object 120 may occupy (e.g., for construction materials being carried overhead on a crane, the hazardous area may be where the construction materials are actually located and a column or conical zone extending from the actual location based on the various characteristics of the worksite object 120 such as speed and direction). The wireless signal of the indicator 124 may be configured to exchange the respective data being generated with the notification server 130 via the network 108. The wireless signal of the indicator 124 may further be configured to exchange the respective data being generated with the warning client 112 via the network 108. As will be described below, the wireless signal of the indicator 124 may provide a more immediate processing approach to generate the warning for the worker. For example, when the wireless signal of the indicator 124 indicates a hazardous area of the worksite object 120, the warning client 112 may process whether the worker occupies a position in the hazardous area. Based on a positive and negative result, the warning client 112 may generate the warning when the warning client 112 positively determines the overlap of the position with the hazardous area.

In the exemplary embodiments, the notification server 130 may include a safety program 132 and act as a server in a client-server relationship with the warning client 112 as well as be in a communicative relationship with the one or more sensors 122 and the indicator 124 of the worksite objects 120. The notification server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the notification server 130 is shown as a single device, in other embodiments, the notification server 130 may be comprised of a cluster or plurality of computing devices, working together or working independently. The notification server 130 is described in greater detail as a hardware implementation with reference to FIG. 3, as part of a cloud implementation with reference to FIG. 4, and/or as utilizing functional abstraction layers for processing with reference to FIG. 5.

The notification server 130 is shown as being remote to the smart device 110. For example, the notification server 130 may be located at a central onsite location (e.g., a mobile office trailer). By utilizing wireless communication pathways (e.g., to provide the workers with freedom to move without being tethered), the notification server 130 may perform operations with corresponding inputs and outputs in a timely manner. Accordingly, the notification server 130 may be responsible for a given construction worksite for performing the operations described below for each of the workers and the worksite objects 120 that are located within the construction worksite. However, the notification server 130 being remote and responsible for a given construction worksite is only illustrative. In another exemplary embodiment, the warning system 100 may include a plurality of notification servers 130. For example, a plurality of notification servers 130 may be positioned strategically and remotely throughout a construction worksite, particularly when the construction worksite has a relatively large area. In a first exemplary embodiment involving a plurality of notification servers 130, each notification server 130 may perform the operations according to the exemplary embodiments and may be responsible for selected areas of the construction worksite including workers and worksite objects 120 in the selected areas, selected workers and worksite objects 120 within the construction worksite, etc. In a second exemplary embodiment involving a plurality of notification servers 130, each notification server 130 may perform the operations according to the exemplary embodiments and may be responsible for an individual worker. Thus, each notification server 130 may be incorporated into a respective one of the smart devices 110. For illustrative purposes, the exemplary embodiments are described with regard to the notification server 130 being positioned remotely relative to the smart devices 110 and the worksite objects 120 and being responsible for a given construction worksite.

In the exemplary embodiments, the safety program 132 may be a software, hardware, and/or firmware application configured to determine a state of a construction worksite and predict when a hazardous condition is likely for each of the workers on the construction worksite. As will be described in detail below, the safety program 132 may monitor the workers on the construction worksite via the smart devices 110 associated therewith and the worksite objects 120. Based on information gathered regarding the workers and worksite objects 120 via the sensors 122, a general state of the construction worksite and/or a specific state relative to each of the workers may be determined. The safety program 132 may analyze the state to determine when a hazardous condition is likely by predicting whether a worker may be in harm's way. In response to predicting the hazardous condition for a selected one or more of the workers, the safety program 132 may generate a signal transmitted to corresponding smart devices 110 for a warning embodied as a sensory feedback output to be generated and received by the workers associated with these smart devices 110. The workers may then take corrective action to remove the worker from the hazardous condition or prevent the hazardous condition from arising.

According to an exemplary embodiment, in determining whether a hazardous condition is predicted, the safety program 132 may be configured to determine a probability that a set of conditions will result in the hazardous condition. For example, a set of conditions for a worker and the worksite objects 120 may have a plurality of different outcomes that are predicted. When at least one of the outcomes has a probability of presenting a hazardous condition to the worker that is greater than a probability threshold, the safety program 132 may perform subsequent operations that entails transmitting the signal to the smart device 110 associated with the worker. The safety program 132 may also be configured to generate the signal that indicates a course of action that may remove the worker from the hazardous condition (e.g., indicating a direction to move) corresponding to the outcome with the probability satisfying the probability threshold. When more than one outcome has a respective probability that is greater than the probability threshold, the safety program 132 may be configured to determine the appropriate course of action that considers these various outcomes (e.g., indicating a direction to move to avoid each outcome predicted as a hazardous condition). When the safety program 132 is incapable of determining an appropriate course of action to avoid each outcome predicted to be a hazardous condition, the safety program 132 may determine the appropriate course of action that minimizes injury to the worker (e.g., utilizing the outcome with the lowest probability of being a hazardous condition).

Figure 2:
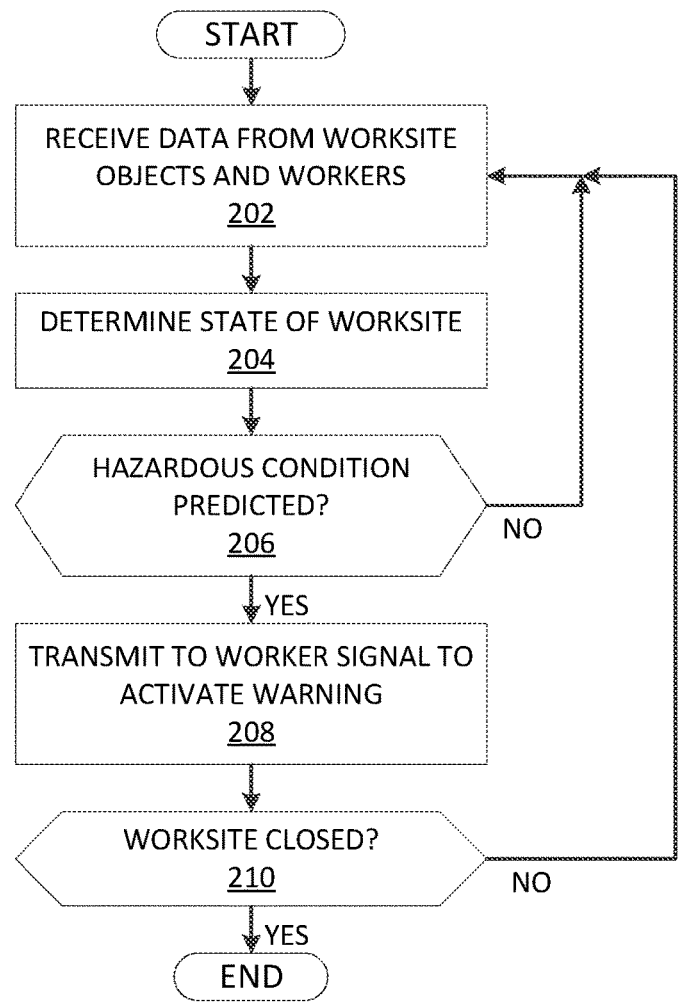
FIG. 2 depicts an exemplary flowchart of a method illustrating the operations of a safety program 132 of the warning system 100 in warning workers of hazardous conditions, in accordance with the exemplary embodiments.

FIG. 2 depicts an exemplary flowchart of a method 200 illustrating the operations of a safety program 132 of the warning system 100 in warning workers of hazardous conditions, in accordance with the exemplary embodiments.

The safety program 132 may receive data through the network 108 from the worksite objects 120 and the workers via the smart devices 110 (step 202). In a first example, the sensors 122 of the worksite objects 120 may measure various parameters, particularly regarding position and movement. In a second example, the indicator 124 may measure a hazardous area corresponding to one of the worksite objects 120. In a third example, the sensors 122 of the smart device 110 may measure various parameters that infer information of the worker, particularly regarding position and movement. The various data from the sensors 122 of the worksite objects 120, the sensors 122 of the smart devices 110, and the indicator 124 may be received by the safety program 132 for subsequent processing.

To further illustrate the operations of the safety program 132, reference is now made to an illustrative example. According to the illustrative exemplary embodiment, the worksite object 120 may be a crane. The crane may be hauling construction material from a first location to a second location along a path. The crane may also be hauling the construction material in an overhead manner relative to the ground or to the workers who may be on the ground or in an elevated position. For illustrative purposes of this exemplary embodiment, the safety program 132 may consider the crane with regard to hazardous conditions posed to the workers. However, the safety program 132 may also incorporate further worksite objects 120 that may be on the construction worksite. For example, the worksite object 120 may be a dump truck traveling within the construction worksite along a further path, where the path of the crane and the further path of the dump truck may overlap or be substantially near or adjacent one another.

According to the illustrative exemplary embodiment, the crane may be equipped with the sensors 122 including at least one of an imager, an ultrasound sensor, an accelerometer, a force based sensor, a gyroscope, an environmental sensor, etc. The construction material may also be equipped with at least one of these sensors 122. The sensors 122 may indicate an identity and/or type of the worksite object 120 as well as convey information used to determine a position and movement of the worksite object 120. For example, the sensors 122 may generate data used by the safety program 132 to determine a position of the crane within the construction worksite, a position of the arm of the crane carrying the construction material, a path along which the arm is moving to carry the construction material, etc. When a wider area is diagnosed by the sensors 122, the data may also be used to determine a position and movement of other worksite objects 120 and/or the workers. For example, the imager may capture images that may be used to determine the position and movement of the crane. The images may also include a worker where each image may indicate a position of the worker and consecutive images may indicate a movement of the worker.

According to the illustrative exemplary embodiment, the crane may further be equipped with the indicator 124 that broadcasts a wireless signal or illuminates an area indicative of a position of the construction materials being moved along the path. The indicator 124 may continuously update the wireless signal and the illuminated area while the crane is operational such that a most current state of the crane and the construction materials being hauled is indicated. The safety program 132 may receive the wireless signal or detect a location of the illuminated area to identify a current hazardous area associated with the crane. For example, the safety program 132 may determine an area under the construction materials being moved overhead based on the wireless signal and/or the illuminated area and further determine this area to be the hazardous area associated with the crane.

According to the illustrative exemplary embodiment, the sensors 122 of the smart device 110 or other components of the smart device 110 (e.g., a GPS chip, a map application, etc.) may provide additional data to the safety program 132. The smart device 110 may convey position and movement data so that the safety program 132 may determine the position and movement of the corresponding worker associated with the smart device 110 while the worker is in the construction worksite. For example, when the smart device 110 is activated or enters the construction worksite, the smart device 110 may associate with the network 108 or establish the client-server relationship with the safety program 132 of the notification server 130. As a result of the safety program 132 determining the presence of the worker in the construction worksite, the safety program 132 may receive the position and movement data of the worker via the corresponding smart device 110 to track the whereabouts of the worker.

The safety program 132 may determine a state of the construction worksite (step 204). Based on the information received from the worksite objects 120 and the workers, the safety program 132 may determine a general state of the construction worksite and/or a specific state of the construction worksite relative to a selected one of the workers. According to the exemplary embodiments, the safety program 132 may select a worker and determine the specific state relative to the selected worker. In determining the specific state for the selected worker, the safety program 132 may determine a plurality of outcomes that may result based on the circumstances of the worker and the circumstances of the worksite objects 120. Thus, the safety program 132 may perform subsequent operations based on an analysis of the selected worker.

The exemplary embodiments are described with regard to the safety program 132 determining specific states for each worker in the construction worksite. However, the use of the specific states with respect to the workers is only illustrative. According to another exemplary embodiment, the safety program 132 may determine specific states for different areas of the construction worksite. Thus, the safety program 132 may perform subsequent operations based on an analysis of the selected area of the construction worksite.

With reference again to the previously introduced example, the safety program 132 may determine the circumstances of the worker and the crane. Based on the information gathered from a selected worker and the crane, the safety program 132 may determine that the crane may be hauling the construction materials overhead along a crane path. The safety program 132 may also determine that the worker may be standing at a position in the construction worksite. Alternatively, the worker may be driving a truck along a truck path.

The safety program 132 may determine whether there is a hazardous condition that is predicted (decision 206). By processing each outcome that is predicted based on the current circumstances of the selected worker and the worksite objects 120, the safety program 132 may determine a probability of whether the outcome presents a hazardous condition to the worker. For example, the safety program 132 may be pre-programmed with a plurality of hazardous conditions (e.g., construction materials being positioned over a worker's position). In another example, the safety program 132 may utilize machine learning to evolve a list of hazardous conditions that may exist on the construction worksite. Based on the types of hazardous conditions that may be present on a construction worksite, the safety program 132 may determine a probability of whether a given outcome matches a hazardous condition. When the probability of the outcome exceeds a probability threshold, the safety program 132 may identify that the given outcome presents a hazardous condition.

As a result of the safety program 132 determining that each of the outcomes of the circumstances of the worker and the worksite objects 120 do not warrant a hazardous condition (decision 206, "NO" branch), the safety program 132 may continue to monitor the construction worksite through receiving data from the worksite objects 120 and the workers via the smart devices 110. As a result of the safety program 132 determining that at least one of the outcomes of the circumstances of the worker and the worksite objects 120 warrant a hazardous condition (decision 206, "YES" branch), the safety program 132 may transmit a signal to the smart device 110 associated with the selected worker so that a warning is activated (step 208).

The safety program 132 may generate the signal to include select types of information. In a first example, the safety program 132 may generate the signal such that the signal triggers a general warning to the worker via the smart device 110 about the predicted hazardous condition. As a result of receiving the general warning, the worker may view the surroundings and take appropriate action. In a second example, the safety program 132 may generate the signal with directional information. The directional signal may trigger a warning to the worker via the smart device 110 about the predicted hazardous condition where the warning further indicates a direction to the worker. The direction may indicate a direction to move or a direction that the hazardous condition is predicted to occur. Based on how the warning is generated, the direction may be indicated in a unique manner that is recognized by the worker. For example, a visual warning may include an arrow. In another example, an audio warning may include an audio direction. In a further example, a haptic warning may include a haptic pattern that is indicative of a specific direction. As a result of receiving the directional signal, the worker may move toward or away from the specified direction (e.g., when the direction indicates a safety direction or a hazard direction, respectively).

The safety program 132 may continue to transmit the signal until the outcome that is the hazardous condition is no longer predicted. As a result of the safety program 132 no longer predicting the hazardous condition, the safety program 132 may terminate transmitting the signal to the smart device 110 so that the warning stops. In another exemplary embodiment, the safety program 132 may transmit a signal to generate the warning and the warning client 112 may start a timer that defines a duration that the warning is to be generated.

Referring now to the previously introduced, illustrative example, the safety program 132 may determine a plurality of outcomes that may result from the circumstances involving the worker and the crane. In one outcome, the crane path of the crane that is hauling the construction materials may be predicted to overlap or be substantially near the position of the worker or predicted to cross the truck path. The safety program 132 may identify that a hazardous condition involves construction materials being positioned overhead with respect to a worker, even when the worker is in a vehicle such as the dump truck. The safety program 132 may determine the probability that the outcome will be this identified hazardous condition. The safety program 132 may also determine that the probability exceeds the probability threshold such that the outcome is designated as a hazardous condition. Accordingly, the safety program 132 may transmit a signal to the smart device 110 associated with the worker who is predicted to face the outcome that is a hazardous condition. The smart device 110 may receive the signal and activate a warning to the worker. The warning may involve one or more sensory feedback outputs such as a visual warning and an audio warning. The signal may also indicate a direction that the worker is to move to avoid the hazardous condition. Thus, the visual warning may intermittently illuminate a light emitting diode of an arrow and the audio warning may repeatedly speak an instruction of a direction to move until the worker is determined to no longer be predicted to face the hazardous condition.

As noted above, the safety program 132 may determine the state of the construction worksite based on specific areas instead of being based on individual workers. When based on different areas, the safety program 132 may identify the workers who are located in a selected area that may have been predicted to have a hazardous condition. As a result of identifying these workers, the safety program 132 may broadcast a signal to each of the workers in the selected area. When providing further information (e.g., direction to move), the safety program 132 may perform an individual analysis to provide the direction with respect to each of the workers in the area predicted to have the hazardous condition.

The safety program 132 may determine whether the construction worksite is closed (decision 210). For example, the safety program 132 may determine when there are no workers in the construction worksite. When this determination is made, the safety program 132 may determine that the construction worksite is closed. In another example, the construction worksite may have expected hours of operation. Accordingly, the safety program 132 may determine when the current time is outside these hours of operation. When the construction worksite is still open (decision 210, "NO" branch), the safety program 132 may continue to monitor the construction worksite by receiving data from the worksite objects 120 and the workers via the smart devices 110.

The method 200 may include further operations that incorporate a process to generate a warning involving the indicator 124 of the worksite object 120 and the warning client 112 on the smart device 110. For example, the process may be a direct processing approach utilizing a positive/negative result in determining whether to generate the warning. In an exemplary process, the indicator 124 may broadcast a wireless signal indicating a hazardous area associated with the worksite object 120 (e.g., an area where construction materials are hanging overhead). The warning client 112 of the smart device 110 may receive the wireless signal from the indicator 124. The warning client 112 may be configured to determine whether a position of the worker associated with the smart device 110 is in or near the hazardous area indicated in the wireless signal. Based on a result of whether this overlap is present or whether this overlap is predicted to occur (e.g., a positive/negative result, an on/off result, a Boolean result, etc.), the warning client 112 may generate the warning. When the warning client 112 is further configured to determine a direction to move to avoid being in the hazardous area, the warning client 112 may generate a directional warning.

The exemplary embodiments may also be configured to provide feedback to a worker who may contribute to the circumstances leading to an outcome that is predicted to be a hazardous condition. For example, the safety program 132 may generate a signal to a crane operator. Thus, the safety program 132 may determine a path for construction materials to be hauled by the crane to prevent the hazardous condition. In an exemplary scenario, there may be a concentration of workers in a zone performing various jobs. When the crane operator enters commands to move the construction materials in a selected path, the safety program 132 may determine that the selected path results in one or more outcomes predicted to be hazardous conditions. Accordingly, the safety program 132 may determine a further path to be used by the crane operator in hauling the construction materials. The safety program 132 may transmit a signal to the smart device 110 associated with the crane operator or to the crane to change in using the further path. In this manner, the safety program 132 may not be required to warn each of the workers but more efficiently warn the crane operator of the predicted hazardous conditions.

The exemplary embodiments may also utilize different types of warnings. For example, the exemplary embodiments described above were directed to sensory feedback outputs that are perceived by the workers to take appropriate action. In another example, the workers may agree to a more passive approach involving electro-muscle stimulation. The workers may wear electrodes on their skin that the safety program 132 may trigger when an outcome is predicted to be a hazardous condition. Thus, as a result of the safety program 132 determining a hazardous condition for a selected worker, the safety program 132 may transmit a signal that activates the electrodes to actuate the muscles of the worker that causes the worker to passively move to a new location.

The exemplary embodiments are configured to warn workers on a worksite of a hazardous condition that is predicted to occur. The exemplary embodiments may monitor the worksite where worksite objects and workers are present on the worksite. Through continuous monitoring of the changing circumstances of the worksite objects and the workers, the exemplary embodiments may determine when a hazardous condition is predicted to occur on the worksite for one or more of the workers. As a result of this determination, the exemplary embodiments may generate a warning to the one or more workers of the hazardous condition so that these workers may take appropriate action to remove the workers from the hazardous condition or avoid the hazardous condition.

Figure 3:
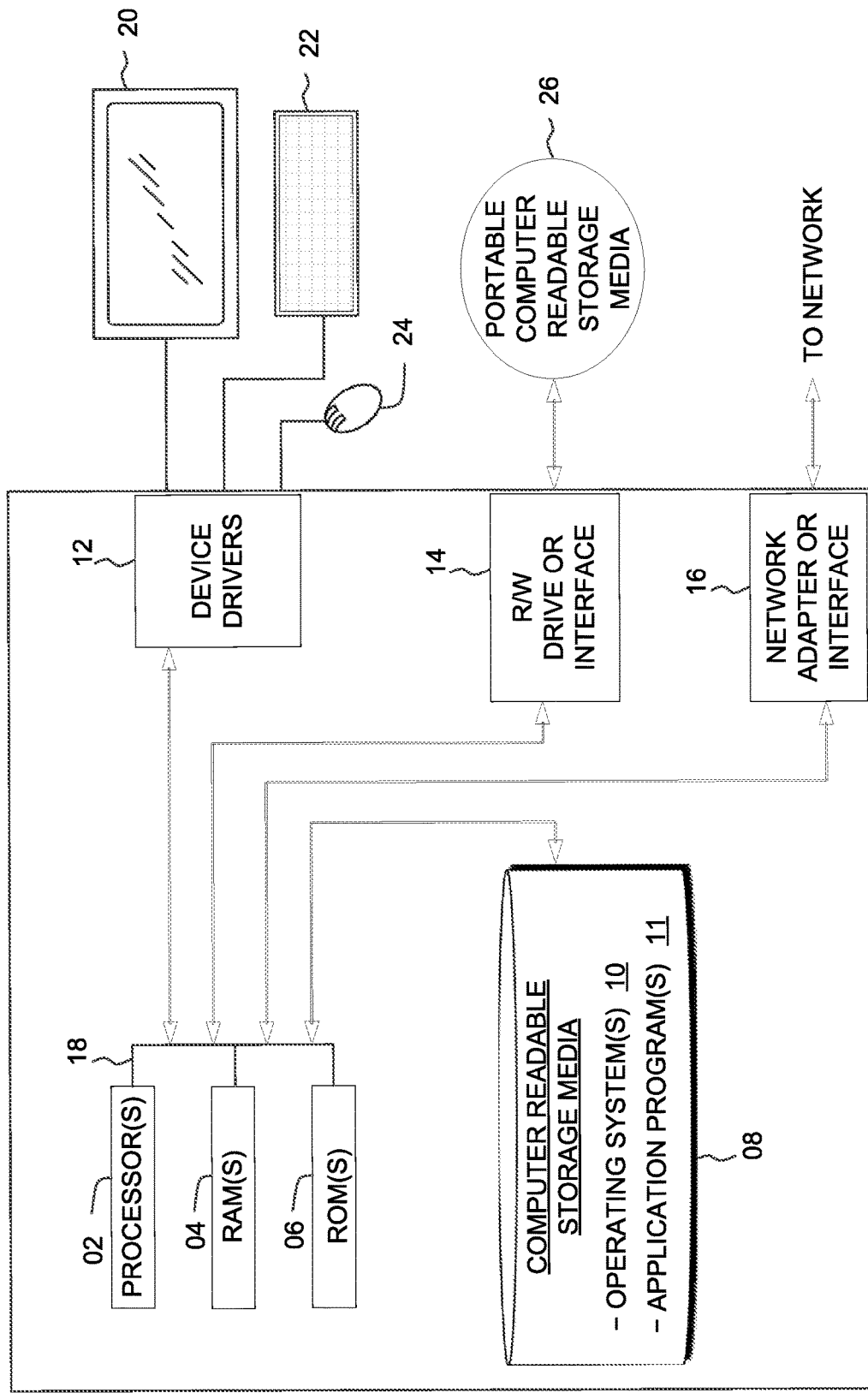
FIG. 3 depicts an exemplary block diagram depicting the hardware components of the warning system 100 of FIG. 1, in accordance with the exemplary embodiments.

FIG. 3 depicts a block diagram of devices within the warning system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
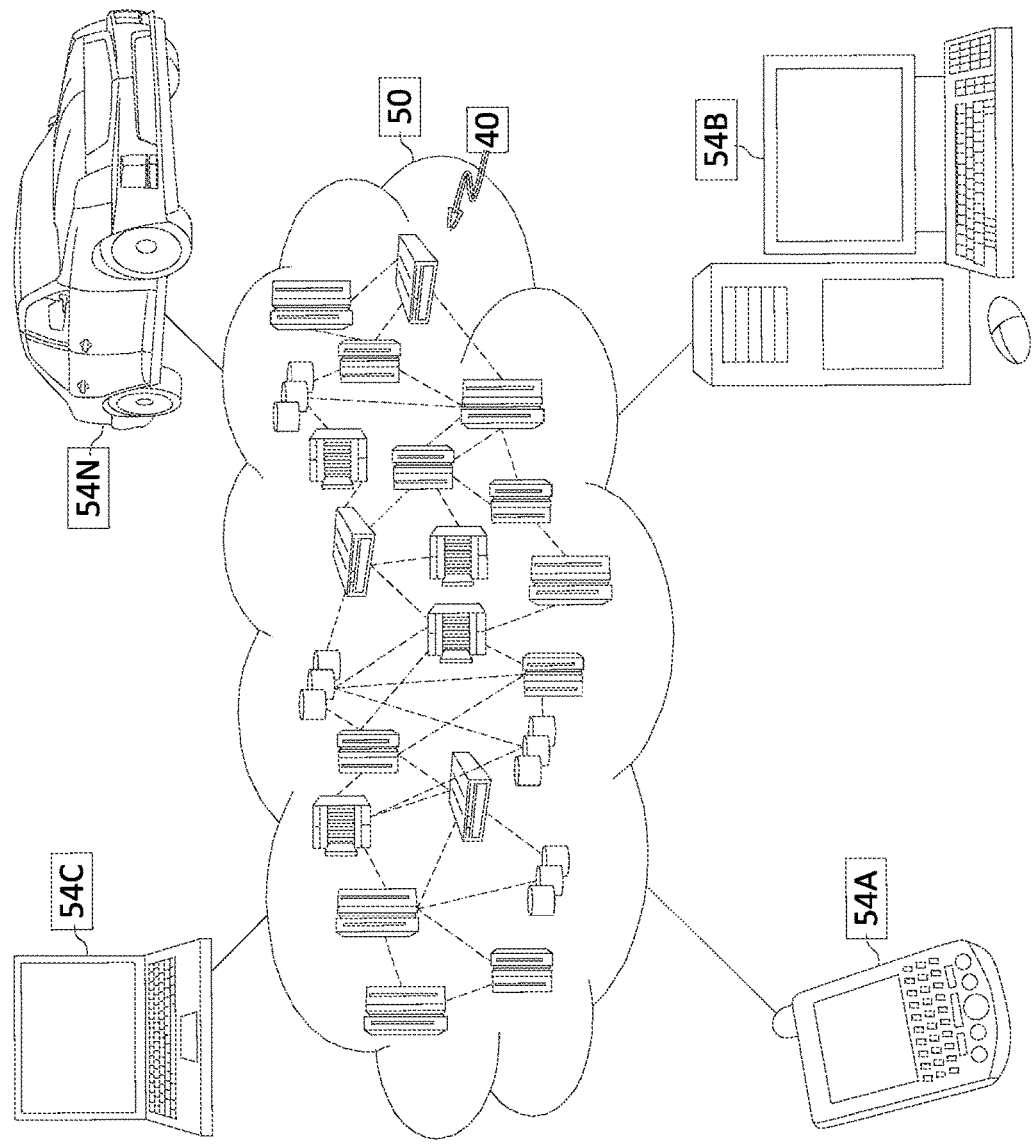
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
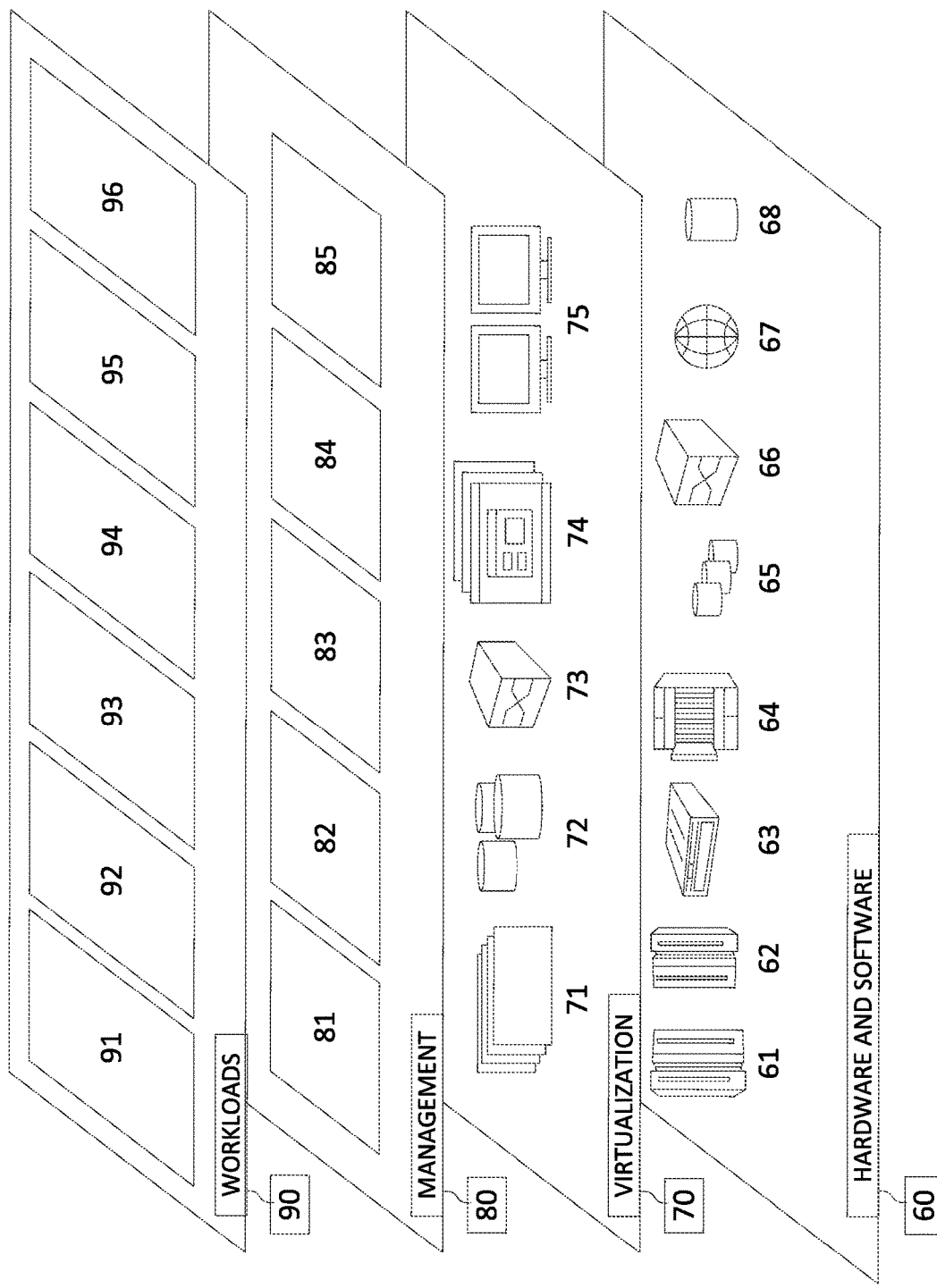
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and safety processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for warning workers of a hazardous condition on a worksite, the method comprising:
   determining at least one outcome involving a plurality of workers concentrated in a zone of the worksite and a vehicular worksite object based on conditions of the worksite;
   predicting whether a select one of the at least one outcome presents a hazardous condition to the workers concentrated in the zone;
   as a result of predicting that the select outcome presents the hazardous condition, determining whether warning the workers concentrated in the zone is more efficient than warning an operator of the vehicular worksite object to avoid the hazardous condition; and
   as a result of determining that warning the operator of the vehicular worksite object is more efficient, transmitting a signal to a device associated with an operator of the vehicular worksite object, the signal triggering a warning to be received by the operator, the device being in a proximity of the operator, the signal indicating a further operation to be performed by the operator on the vehicular worksite object,
   wherein the worksite is a construction worksite, wherein the vehicular worksite object is a crane hauling construction materials, and wherein the select outcome presenting the hazardous condition is the construction materials being positioned overhead of the workers.

2. The computer-implemented method of claim 1, further comprising:
   receiving sensor data from at least one sensor associated with the vehicular worksite object and at least one further device associated with the workers; and
   determining the conditions of the worksite based on the sensor data.

3. The computer-implemented method of claim 2, further comprising:
   receiving indicator data from the vehicular worksite object, the indicator data indicating a hazardous area associated with the vehicular worksite object,
   wherein the determining the conditions of the worksite is further based on the indicator data.

4. The computer-implemented method of claim 1, wherein the predicting whether the select outcome presents the hazardous condition to the workers comprises:
   determining a probability that the outcome corresponds to the hazardous condition; and
   as a result of the probability being at least a probability threshold, determining that the outcome presents the hazardous condition.

5. The computer-implemented method of claim 1, wherein the warning is one of a visual feedback output, an audio feedback output, a haptic feedback output, or a combination thereof.

6. The computer-implemented method of claim 1, wherein the signal indicates a predicted direction of the hazardous condition to the workers, the warning indicating the predicted direction to the operator.

7. A computer program product for warning workers of a hazardous condition on a worksite, the computer program product comprising:
   one or more non-transitory computer-readable storage media and program instructions stored on the one or more non-transitory computer-readable storage media capable of performing a method, the method comprising:
      determining at least one outcome involving a plurality of workers concentrated in a zone of the worksite and a vehicular worksite object based on conditions of the worksite;
      predicting whether a select one of the at least one outcome presents a hazardous condition to the workers concentrated in the zone;
      as a result of predicting that the select outcome presents the hazardous condition, determining whether warning the workers concentrated in the zone is more efficient than warning an operator of the vehicular worksite object to avoid the hazardous condition; and
      as a result of determining that warning the operator of the vehicular worksite object is more efficient, transmitting a signal to a device associated with an operator of the vehicular worksite object, the signal triggering a warning to be received by the operator, the device being in a proximity of the operator, the signal indicating a further operation to be performed by the operator on the vehicular worksite object,
      wherein the worksite is a construction worksite, wherein the worksite object is a crane hauling construction materials, and wherein the select outcome presenting the hazardous condition is the construction materials being positioned overhead of the worker.

8. The computer program product of claim 7, wherein the method further comprises:
- receiving sensor data from at least one sensor associated with the vehicular worksite object and at least one further device associated with the workers; and
- determining the conditions of the worksite based on the sensor data.

9. The computer program product of claim 8, wherein the method further comprises:
- receiving indicator data from the vehicular worksite object, the indicator data indicating a hazardous area associated with the vehicular worksite object,
- wherein the determining the conditions of the worksite is further based on the indicator data.

10. The computer program product of claim 7, wherein the predicting whether the select outcome presents the hazardous condition to the workers comprises:
- determining a probability that the outcome corresponds to the hazardous condition; and
- as a result of the probability being at least a probability threshold, determining that the outcome presents the hazardous condition.

11. The computer program product of claim 7, wherein the warning is one of a visual feedback output, an audio feedback output, a haptic feedback output, or a combination thereof.

12. The computer program product of claim 7, wherein the signal indicates a predicted direction of the hazardous condition to the workers, the warning indicating the predicted direction to the operator.

13. A computer system for warning workers of a hazardous condition on a worksite, the computer system comprising:
- one or more computer processors, one or more computer-readable storage media, and program instructions stored on the one or more of the computer-readable storage media for execution by at least one of the one or more processors capable of performing a method, the method comprising:
  - determining at least one outcome involving a plurality of workers concentrated in a zone of the worksite and a vehicular worksite object based on conditions of the worksite;
  - predicting whether a select one of the at least one outcome presents a hazardous condition to the workers concentrated in the zone;
  - as a result of predicting that the select outcome presents the hazardous condition, determining whether warning the workers concentrated in the zone is more efficient than warning an operator of the vehicular worksite object to avoid the hazardous condition; and
  - as a result of determining that warning the operator of the vehicular worksite object is more efficient, transmitting a signal to a device associated with an operator of the vehicular worksite object, the signal triggering a warning to be received by the operator, the device being in a proximity of the operator, the signal indicating a further operation to be performed by the operator on the vehicular worksite object,
  - wherein the worksite is a construction worksite, wherein the worksite object is a crane hauling construction materials, and wherein the select outcome presenting the hazardous condition is the construction materials being positioned overhead of the worker.

14. The computer system of claim 13, wherein the method further comprises:
- receiving sensor data from at least one sensor associated with the vehicular worksite object and at least one further device associated with the workers; and
- determining the conditions of the worksite based on the sensor data.

15. The computer system of claim 14, wherein the method further comprises:
- receiving indicator data from the vehicular worksite object, the indicator data indicating a hazardous area associated with the vehicular worksite object,
- wherein the determining the conditions of the worksite is further based on the indicator data.

16. The computer system of claim 13, wherein the predicting whether the select outcome presents the hazardous condition to the workers comprises:
- determining a probability that the outcome corresponds to the hazardous condition; and
- as a result of the probability being at least a probability threshold, determining that the outcome presents the hazardous condition.

17. The computer system of claim 13, wherein the warning is one of a visual feedback output, an audio feedback output, a haptic feedback output, or a combination thereof.

18. The computer system of claim 13, wherein the signal indicates a predicted direction of the hazardous condition to the workers, the warning indicating the predicted direction to the operator.

* * * * *